(12) United States Patent
Bloschies

(10) Patent No.: US 12,188,341 B2
(45) Date of Patent: Jan. 7, 2025

(54) TRANSMISSION SHAFT BRAKE FOR ENGINE AUTO RESTART

(71) Applicant: EKU POWER DRIVES INC., Spring, TX (US)

(72) Inventor: Lothar Bloschies, Stuttgart (DE)

(73) Assignee: EKU POWER DRIVES INC., Spring, TX (US)

( * ) Notice: Subject to any disclaimer, the term of this patent is extended or adjusted under 35 U.S.C. 154(b) by 0 days.

(21) Appl. No.: 18/410,565

(22) Filed: Jan. 11, 2024

(65) Prior Publication Data

US 2024/0218774 A1 Jul. 4, 2024

Related U.S. Application Data

(63) Continuation of application No. 17/453,916, filed on Nov. 8, 2021, now Pat. No. 11,905,810.

(51) Int. Cl.
| | | |
|---|---|---|
| *E21B 43/26* | (2006.01) | |
| *F02D 41/04* | (2006.01) | |
| *F02N 7/00* | (2006.01) | |
| *F04B 17/05* | (2006.01) | |
| *F16D 65/18* | (2006.01) | |
| *F16D 121/02* | (2012.01) | |

(52) U.S. Cl.
CPC ........ *E21B 43/2607* (2020.05); *F02D 41/042* (2013.01); *F02N 7/00* (2013.01); *F04B 17/05* (2013.01); *F16D 65/18* (2013.01); *F16D 2121/02* (2013.01)

(58) Field of Classification Search
CPC ...... E21B 43/2607; F02D 41/042; F02N 7/00; F04B 17/05; F16D 65/18; F16D 2121/02
See application file for complete search history.

(56) References Cited

U.S. PATENT DOCUMENTS 11,905,810 B2 * 2/2024 Bloschies ............... F16D 65/18
2018/0354485 A1 12/2018 Adeeb et al.

FOREIGN PATENT DOCUMENTS

| CN | 211969622 U | 11/2020 |
| CN | 113323834 A | 8/2021 |
| CN | 113356942 A * | 9/2021 |

OTHER PUBLICATIONS

International Search Report and Written Opinion dated Jan. 31, 2023 for Application No. PCT/US2022/079478.

* cited by examiner

*Primary Examiner* — Jacob M Amick
(74) *Attorney, Agent, or Firm* — Whitaker Chalk Swindle & Schwartz PLLC; Enrique Sanchez, Jr.

(57) ABSTRACT

A system and method for controlling a hydraulic fracturing pumping system is described herein. The method can include stopping an engine coupled to a hydraulic fracturing pumping system including at least one pump by supplying pressure from an accumulator to a hydraulic braking system including a brake. The method can also include starting the engine coupled to the hydraulic fracturing pumping system and releasing the brake.

20 Claims, 9 Drawing Sheets

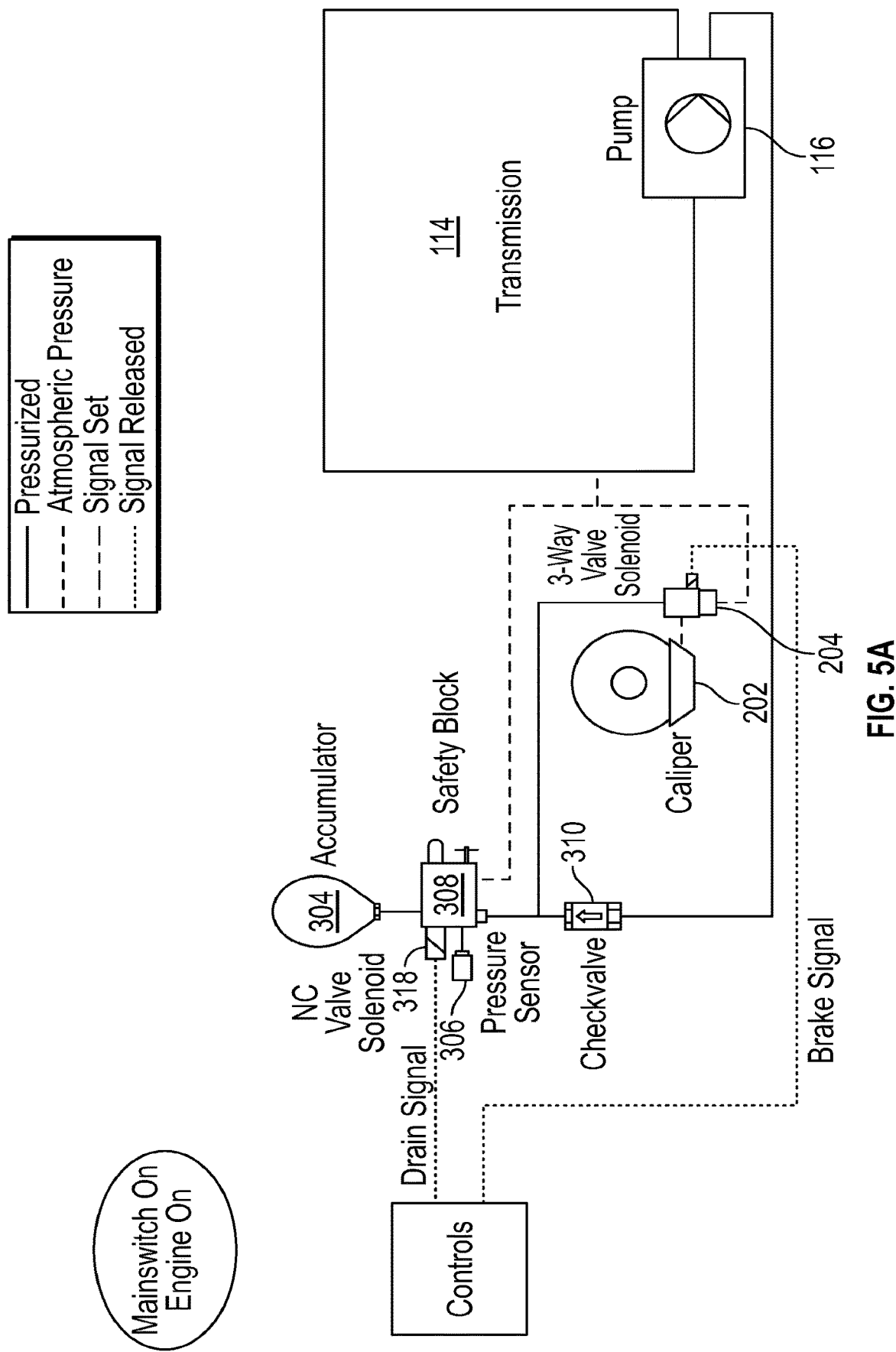

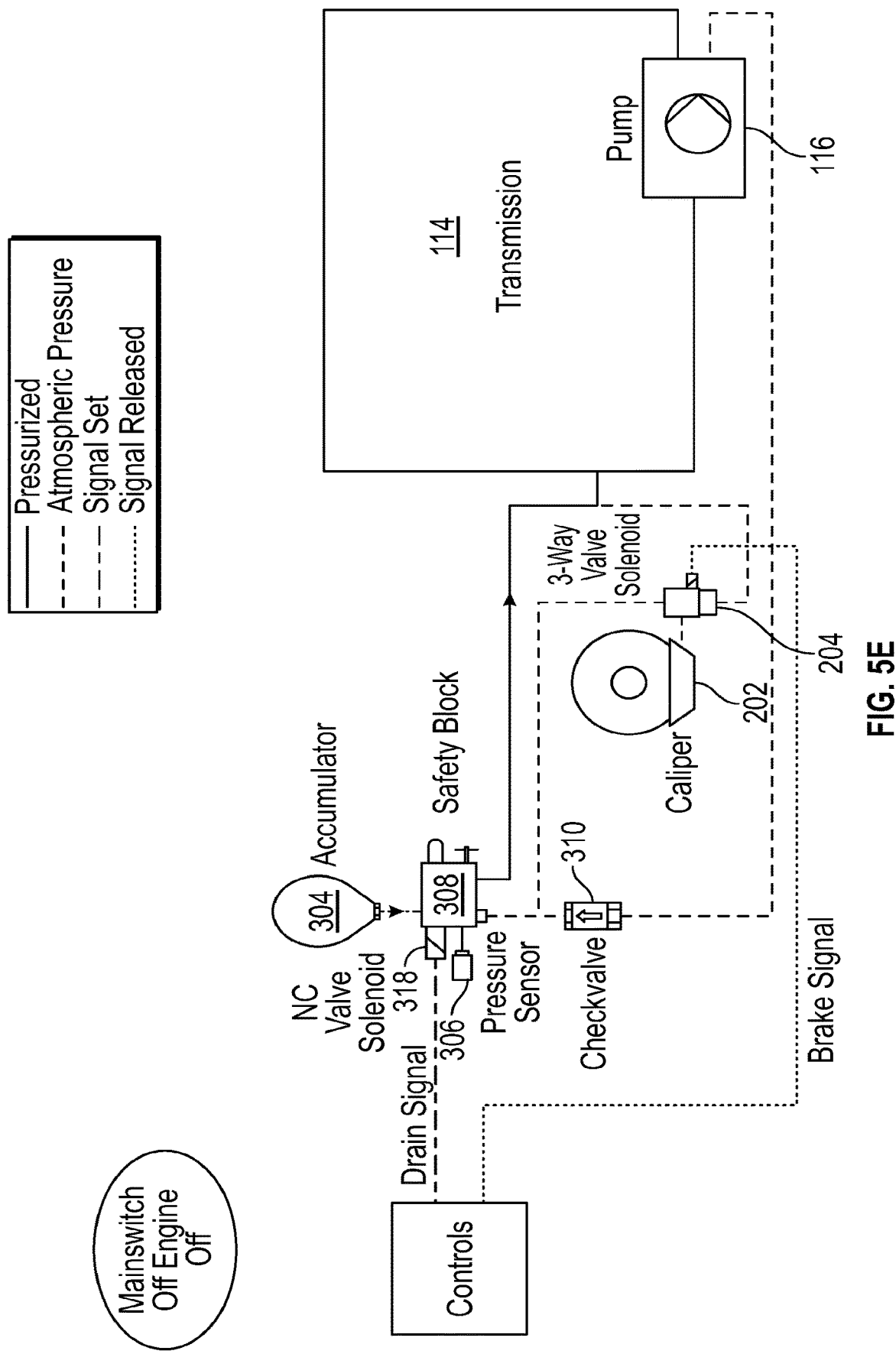

TRANSMISSION SHAFT BRAKE FOR ENGINE AUTO RESTART

CROSS-REFERENCE TO RELATED APPLICATIONS

This application is a continuation of pending U.S. patent application Ser. No. 17/453,916 filed Nov. 8, 2021 the entirety of which is herein incorporated by reference.

BACKGROUND

The present disclosure relates to hydraulic fracturing pumps. In particular, the present disclosure relates to systems and methods for controlling one or more hydraulic fracturing pumps that are stationary while in operation.

Hydraulic fracturing pump systems oftentimes include diesel engines coupled to reciprocating pumps or frac pumps. These hydraulic fracturing pump systems may include an engine standby controller (or ESC) system. These ESC systems may be configured to shut down the diesel engine when it is not in use to reduce diesel fuel consumption and emissions output. When the diesel engine is off, an ESC system may utilized one or more batteries to power certain auxiliary systems ensure the diesel engine can quickly restart when needed.

When restarting the engine, there is risk that the shaft may rotate, causing unwanted pressure on the power end of the pump which is a potential safety hazard. To prevent this, the hydraulic fracturing pump systems are oftentimes equipped with a brake, such as a disc brake mounted to a shaft coupled to the pump or an internal brake gear set by a combination of gears inside a gearbox coupled to the pump, which is actuated by hydraulic pressure. The hydraulic pressure can be supplied by the engine when it is in idle, but when an ESC system shuts down the engine there may be insufficient hydraulic pressure necessary to engage the brake, which is needed for the engine to restart in safe manner. What is needed, therefore, is an improved system and method for providing power to a brake configured to stop a pump when the engine used to power the brake is idled or stationary.

BRIEF SUMMARY

A method for controlling a hydraulic fracturing pumping system is described herein. The method can include stopping an engine coupled to a hydraulic fracturing pumping system including at least one pump by supplying pressure from an accumulator to a hydraulic braking system including a brake. The method can also include starting the engine coupled to the hydraulic fracturing pumping system and releasing the brake.

A hydraulic fracturing pumping system is also described herein. The hydraulic fracturing pumping system can also include a first pump coupled to an engine via a transmission and a second pump coupled to the transmission, wherein the second pump is a hydraulic pump. The hydraulic fracturing pumping system can also include an accumulator coupled to the hydraulic pump. The accumulator can be configured to store hydraulic pressure generated via the hydraulic pump. The hydraulic fracturing pumping system can also include a hydraulic brake system coupled to the accumulator.

A hydraulic fracturing pumping system disposed on a trailer is also described herein. The hydraulic fracturing pumping system can include a diesel engine, a transmission, a hydraulic pump coupled to the transmission, and a transmission oil reservoir coupled to the transmission. The hydraulic fracturing pumping system can also include a reciprocating plunger pump, a shaft mechanically linking the transmission to the reciprocating plunger pump, and an accumulator in fluid communication hydraulic pump. The accumulator can be configured to store hydraulic pressure generated via the hydraulic pump. A hydraulic brake system can be coupled to the accumulator.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The present invention may best be understood by referring to the following description and accompanying drawings that are used to illustrate embodiments of the invention. In the drawings:

FIG. 5A illustrates a schematic showing hydraulic control of the brake system illustrated in FIG. 3 when the pump trailer is operating at step 402 of the method illustrated by FIG. 4.

FIG. 5E illustrates a schematic showing hydraulic control of the brake system illustrated in FIG. 3 when the pump trailer is operating at step 410 of the method illustrated by FIG. 4.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

Figure 1:
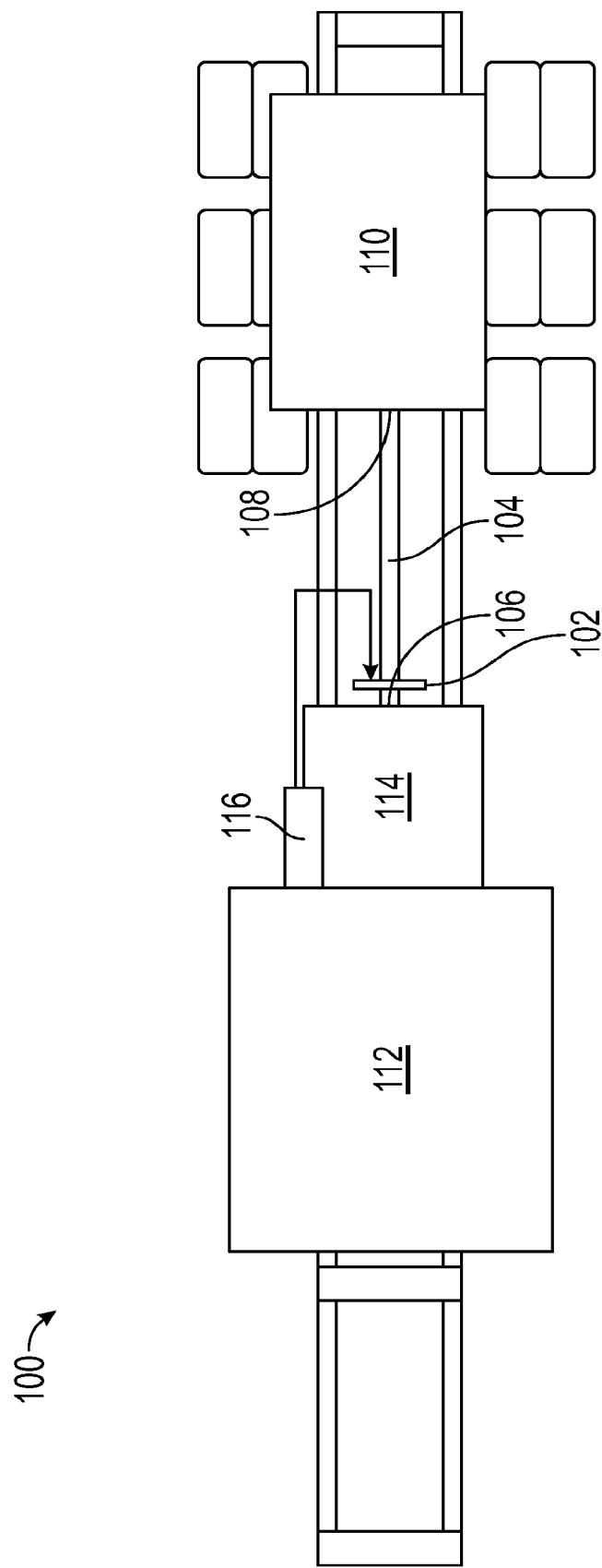
FIG. 1 illustrates a schematic showing components of a frac pump trailer containing a brake, according to an embodiment.

FIG. 1 illustrates a schematic showing components of a pump trailer 100 containing a brake 102. The brake 102 can be coupled or otherwise attached to a shaft 104. The shaft 104 can have a first end 106 and a second end 108. The brake 102 can be a disc brake, containing a rotor and a caliper, a drum brake, any other suitable brake device. The second end 108 of the shaft 104 can be coupled to one or more pumps 110, such as frac pumps or reciprocating plunger pumps. The first end 106 of the shaft 104 can be coupled to an engine 112, optionally via a transmission 114. As shown in FIG. 1, a hydraulic pump 116 can be configured to provide hydraulic pressure suitable to actuate the brake 102 via one or more hydraulic lines 118 when the engine 112 is in use. In one or more embodiments, the hydraulic pump 116 can be located on or in the transmission 114 and the pressure needed to set the brake 102 can be supplied by the hydraulic pump 116 when the engine 112 is running at idle speeds or greater. The hydraulic pump 116 can be used to pump a transmission oil suitable for actuating the brake 102. As used herein, the term "transmission oil" means any fluid containing a mineral oil that is suitable for use as a hydraulic fluid, transmission fluid, transmission oil, or brake fluid.

The engine 112 can be or include any suitable internal combustion engine. In one or more embodiments, the engine 112 can be a diesel engine, a dual-fuel engine (natural gas and diesel), or a turbine. In other embodiments, the engine 112 can be or include an electric motor. The electric motor can be configured to withstand an oilfield environment.

The pump 110 can be or include any pump suitable for pumping a fracturing fluid or gravel pack fluid into a wellbore and/or its surrounding subterranean formation. In one or more embodiments, the pump 110 can be or include a positive displacement pump, a plunger pump, or a reciprocating pump. For example, the pump 110 can be a triplex pump or a quintuplex pump each configured to provide a power output of about 1,000 HP, about 1,500 HP or about 2,000 HP to about 2,500 HP, about 3,000 HP, or about 5,000 HP or more.

As illustrated in FIG. 1, the engine 112 can be disposed along with the pump 110 on a single vehicle, such as a trailer. In other embodiments (not shown), the engine 112 vehicle or platform separate and distinct from a vehicle or platform supporting the pump 110. Engines 112, pumps 112, and configurations of same suitable for use in the present disclosure are described in U.S. Pat. Nos. 7,845,413, 8,997,904, 9,103,193, 9,140,110, 9,395,049, 9,683,432, and 10,927,802, each of which is incorporated by reference herein in its entirety.

Figure 2:
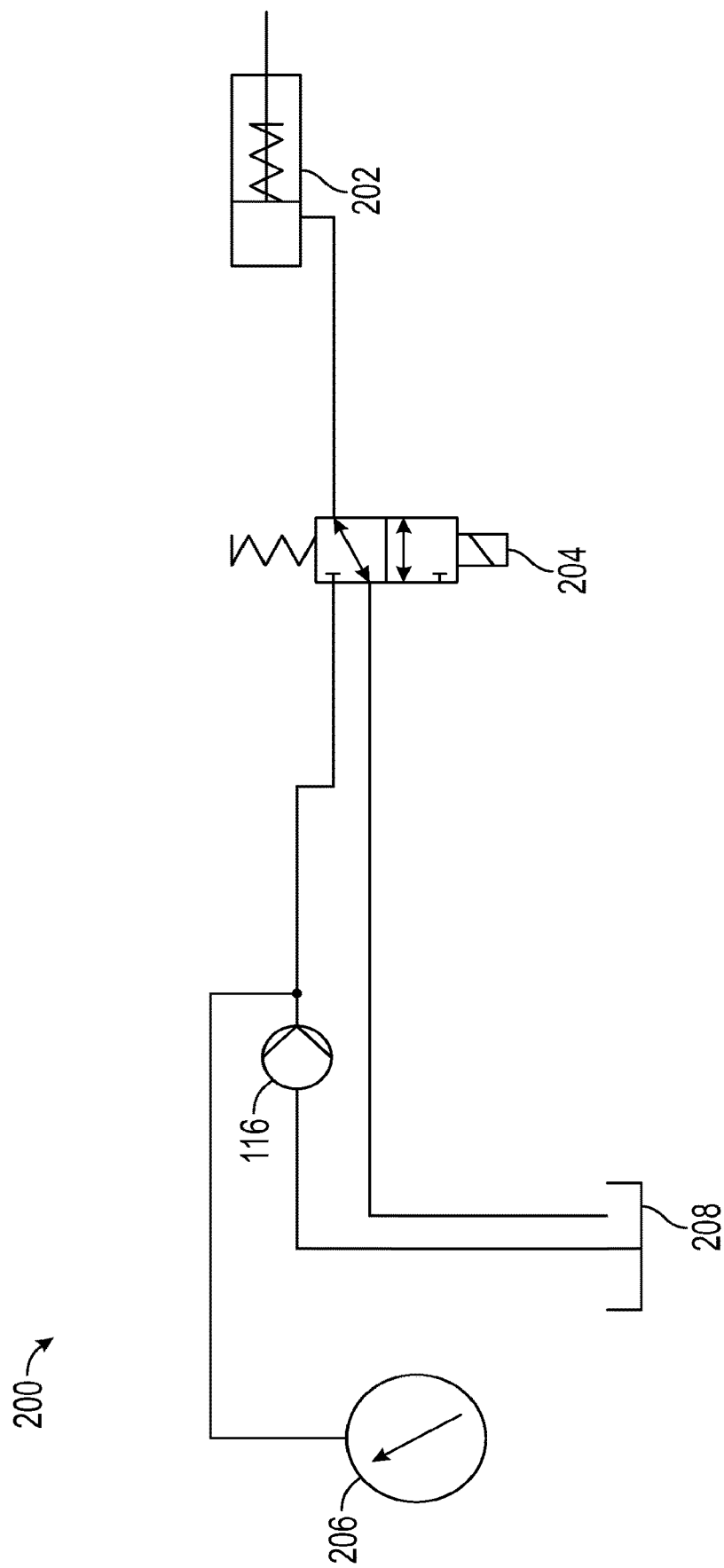
FIG. 2 illustrates a schematic showing hydraulic control of a conventional brake system.

FIG. 2 illustrates a schematic showing hydraulic control of a conventional brake system 200. The brake system 200 can include a brake caliper 202, a three-way solenoid valve 204, a pressure gauge 206, the hydraulic pump 116, and a reservoir 208. As shown, the brake caliper 202 can be in fluid communication with the three-way solenoid valve 204, the pressure gauge 206, the hydraulic pump 116, and the reservoir 208 via the hydraulic lines 118. Transmission oil can be stored in the reservoir 208. The hydraulic pump 116 can be in fluid communication with the reservoir 208 and the hydraulic pump 116 can be configured to pump the transmission oil from the reservoir 208 to the three-way solenoid valve 204. The three-way solenoid valve 204 can be a three-way solenoid valve configured to direct transmission oil back to the reservoir 208 when the three-way solenoid valve 204 is closed or direct the transmission oil to the brake caliper 202 when the three-way solenoid valve 204 is open.

When the engine 112 is running, the hydraulic pump 116 located on or in the transmission 114 can be configured to provide a pressure in the hydraulic lines 118 sufficient to actuate the brake caliper 202. In particular, when a brake signal is set or is otherwise transmitted, the three-way solenoid valve 204 opens to allow transfer of transmission oil from the reservoir 208 to the brake caliper 202 under a pressure sufficient to actuate the brake caliper 202. When the brake signal is not set, the three-way solenoid valve 204 returns to the closed position. When the three-way solenoid valve 204 is closed, transmission oil supplied from the reservoir 208 and hydraulic pump 116 is recycled and discharged to the reservoir 208 through the three-way solenoid valve 204. When the engine 112 is not in use or is otherwise stationary, the hydraulic pump 116 can be unable to provide the pressure in the hydraulic lines 118 sufficient to actuate the brake caliper 202.

Figure 3:
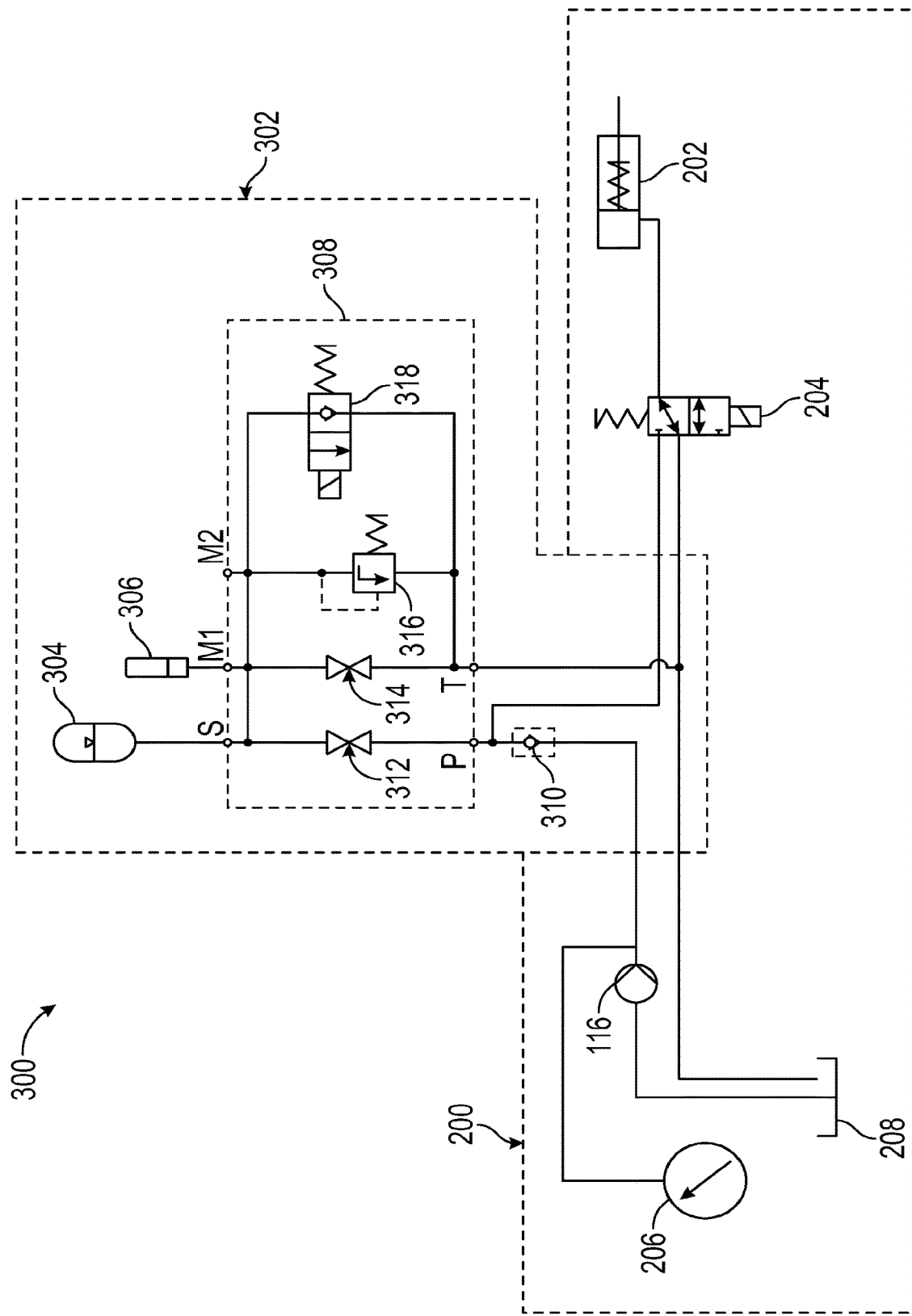
FIG. 3 illustrates a schematic showing hydraulic control of a brake system when an engine is stationary, according to an embodiment.

FIG. 3 illustrates a schematic showing hydraulic control of a brake system 300 for when an engine 112 is stationary. As shown in FIG. 3, the brake system 300 can include an accumulator device 302 coupled with, connected to, or otherwise fluidically linked with an existing brake system, such as the conventional brake system 200. The accumulator device 302 can include an accumulator 304, a pressure sensor 306, a safety block 308, and a check valve 310. The accumulator 304 can be or include any suitable accumulator device. For example, the accumulator 304 can be or include any suitable vessel, cylinder, or chamber configured to maintain a preset or fixed hydraulic pressure therein. The check valve 310 can be disposed downstream from the hydraulic pump 116 so that, when the engine 112 is in operation, the hydraulic pump 116 is capable of operating to subject the transmission oil to a pressure sufficient to engage the check valve 310 in an open position, thereby permitting the transmission oil to pass therethrough. Transmission oil passing through the check valve 310 then enters the safety block 308.

The safety block 308 can include a first valve 312, a second valve 314, an overflow valve 316, and a two-way solenoid valve 318. The first valve 312 and second valve 314 can each be or include any suitable valve apparatus, such as a manually actuated valve. For example, the first valve 312 and the second valve 314 can each be or include a ball valve. As shown in FIG. 3, the first valve 312, second valve 314, overflow valve 316, and two-way solenoid valve 318 can be fluidically linked to each other and arranged in a parallel configuration.

When the pump trailer 100 is operating in the field, the first valve 312 remains in an open position while the second valve 314 and the two-way solenoid valve 318 remain in a closed position. In this arrangement, the transmission fluid entering the safety block 308 passes through the open first valve 312 and into the accumulator 304. The transmission oil will continue to enter into the accumulator 304 until the accumulator 304 is charged to a preset pressure or other suitable pressure, for example a pressure sufficient to actuate the brake caliper 202. In one or more embodiments, the accumulator 304 can be configured to be charged with transmission oil to a pressure of at least about 100 kPa, at least about 250 kPa, at least about 500 kPa, at least about 1,000 kPa, or at least about 1,500 kPa. For example, the accumulator 304 can be charged with transmission oil at a pressure from about 500 kPa, about 1,000 kPa, or about 1,500 kPa to about 2,000 kPa, about 3,500 kPa, or about 5,000 kPa.

The three-way solenoid valve 204 can be disposed downstream of the check valve 310. As shown in FIG. 3, the fluid line can split downstream of the check valve 310 and connect into the three-way solenoid valve 204 so that at least a portion of the pressurized transmission oil leaving the hydraulic pump 116 can be introduced to the three-way solenoid valve 204. The transmission oil introduced to the three-way solenoid valve 204 can be directed back to the reservoir 208 when the three-way solenoid valve 204 is closed or to the brake caliper 202 when the three-way solenoid valve 204 is open. This configuration enables the brake caliper 202 to be set at any time when the engine 112 is in operation.

When the engine 112 is stationary, the pressurized transmission oil in the accumulator 304 can be released upon input of a brake signal. The released transmission oil exiting the accumulator 304 can then pass through the open first valve 312 and into a line in open fluid communication with the three-way solenoid valve 204. The released transmission oil introduced to the three-way solenoid valve 204 can be directed back to the reservoir 208 when the three-way solenoid valve 204 is closed or to the brake caliper 202 when the three-way solenoid valve 204 is open. This configuration enables the brake caliper 202 to be set when the engine 112 is stationary. The overflow valve 316 is disposed in the safety block 302 so that the transmission oil pumped by the hydraulic pump 116 and/or released from the accumulator 304 is maintained at a pressure of about 10 bar, about 12 bar, or about 14 bar to about 18 bar, about 20 bar, or about 25 bar or any other pressure sufficient to actuate the brake caliper 202.

In one or more embodiments, the engine 112 can be stationary as a result of being in a standby mode. For example, the engine 112 can be in a standby mode brought about by an automatic standby system, such as an engine standby controller (ESC). Examples of suitable ESCs are described in U.S. Pat. Nos. 10,358,989, 10,371,113, and 10,570,868, each of which is incorporated by reference herein in its entirety. The ESC can be disposed on the trailer 100 and coupled to the engine 112. In one or more embodiments, the engine 112 electrically connected to or at least partially controlled by an ESC can be placed in a standby mode, during which the pressurized transmission oil in the accumulator 304 can be utilized as needed to achieve a transmission oil pressure sufficient to actuate the brake caliper 202 upon input of a brake signal.

When the engine 112 is turned off and a main switch is turned off (resulting in a loss of power to the brake system 300), the accumulator 304 and safety block 302 can be drained of any remaining transmission oil, thereby enabling maintenance or removal of any portion of the brake system 300. The accumulator 304 and safety block 302 can be drained of the transmission oil by opening the two-way solenoid valve 318 to allow transmission oil to pass therethrough and ultimately into the reservoir 208. The accumulator 304 and safety block 302 can also be drained of the transmission oil by opening the second valve 314 to allow the transmission oil to pass therethrough and ultimately into the reservoir 208.

Figure 4:
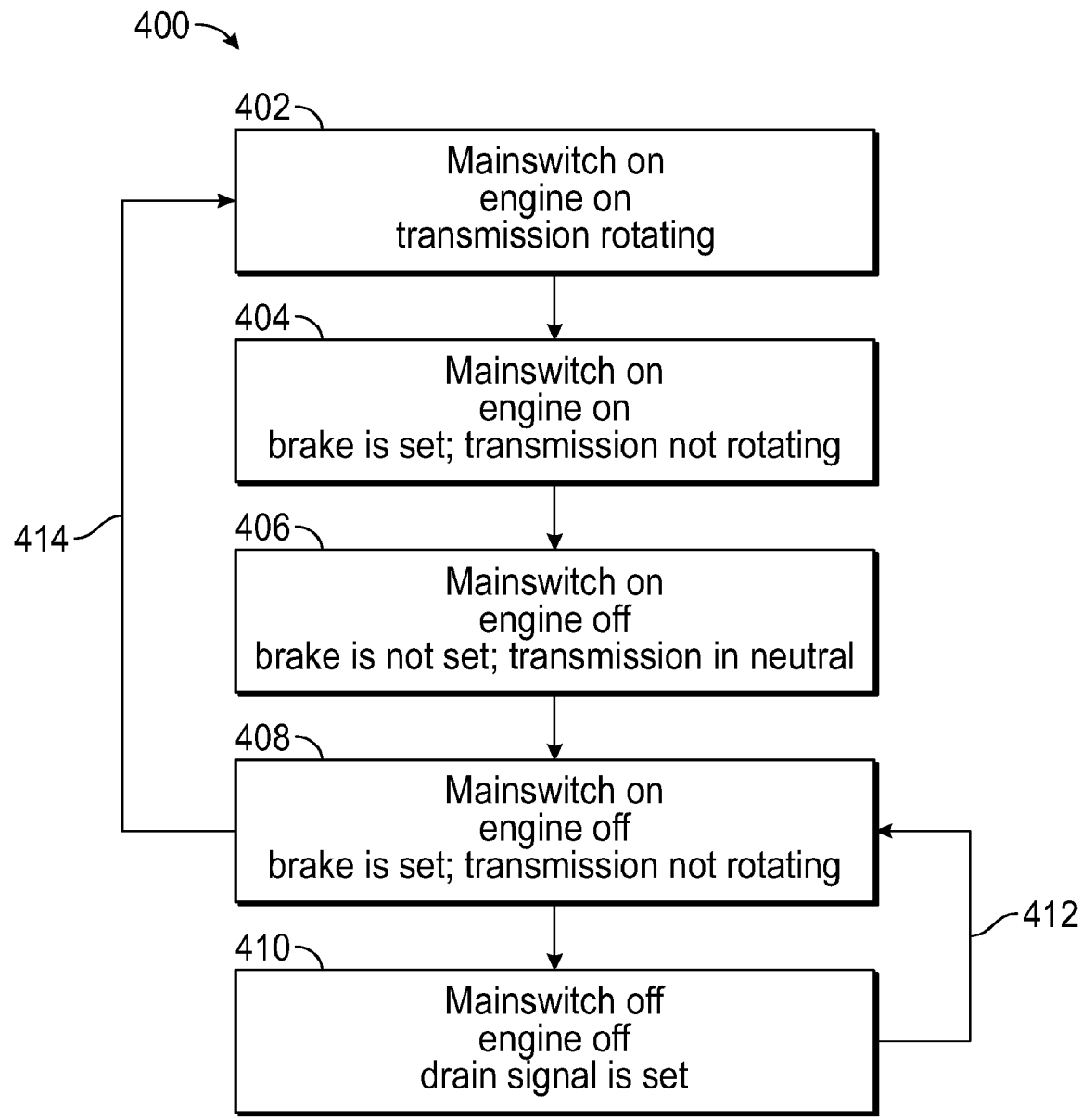
FIG. 4 illustrates a flow chart of a method for operating the brake system of FIG. 3, according to an embodiment.

FIG. 4 illustrates a flow chart of a method 400 for operating the brake system 300. The method 400 can include an initial step in which the main power switch, or mainswitch (not shown), of the pump trailer 100 is on and the engine 112 is on, as at 402. The transmission 114 and shaft 104 are also rotating in step 402. Step 402 can be or include a mode of operation when the engine 112 is on and operating the pump 110. Next, the brake 102 can be set (by actuating the brake caliper 202) so that the transmission 114 and shaft 104 are not rotating or are stationary, as at 404. Also, at step 404, the pump 110 is stationary. In the next mode of operation, the engine 112 is shut off while the mainswitch remains on, as at 406. In step 406, the brake 102 is not set and the transmission 114 is in neutral. Next, the brake 102 is set while the engine 112 is shut off and the mainswitch remains on, as at 408. At step 408, the brake 102 is set at a force sufficient to prevent rotation of the transmission 114 and the shaft 104 so that both transmission 114 and the shaft 104 are stationary.

The engine 112 can be shut off by virtue of being in a standby mode, for example, a standby mode induced by an ESC, when the engine 112 is electrically connected to or at least partially controlled by an ESC. When the engine 112 is placed in a standby mode or is otherwise shut off, the pressurized transmission oil in the accumulator 304 can be utilized as needed to achieve a transmission oil pressure sufficient to actuate the brake caliper 202 upon input of a brake signal. In one or more embodiments, the pressure sensor 306 can communicate or send a signal to the ESC indicating when the accumulator 304 is fully charged or otherwise at a pressure sufficient to actuate the brake 102. The ESC can be configured to place the engine 112 in a standby mode only when the pressure sensor 306 detects a sufficient transmission oil pressure in the accumulator 304.

After step 408, the engine 112 and the mainswitch can be turned off so that the accumulator can be drained, as at 410. When the pump trailer 100 is at step 410 it is considered to be "turned off" or otherwise in an "off" state or configuration. To turn the pump trailer 100 and its engine 112 back on, a user can first turn the mainswitch back on via step 412, as at 408, and then engine 112 can be turned back on via step 414, as at 402, with steps 402-414 being repeated as desired.

Figure 5B:
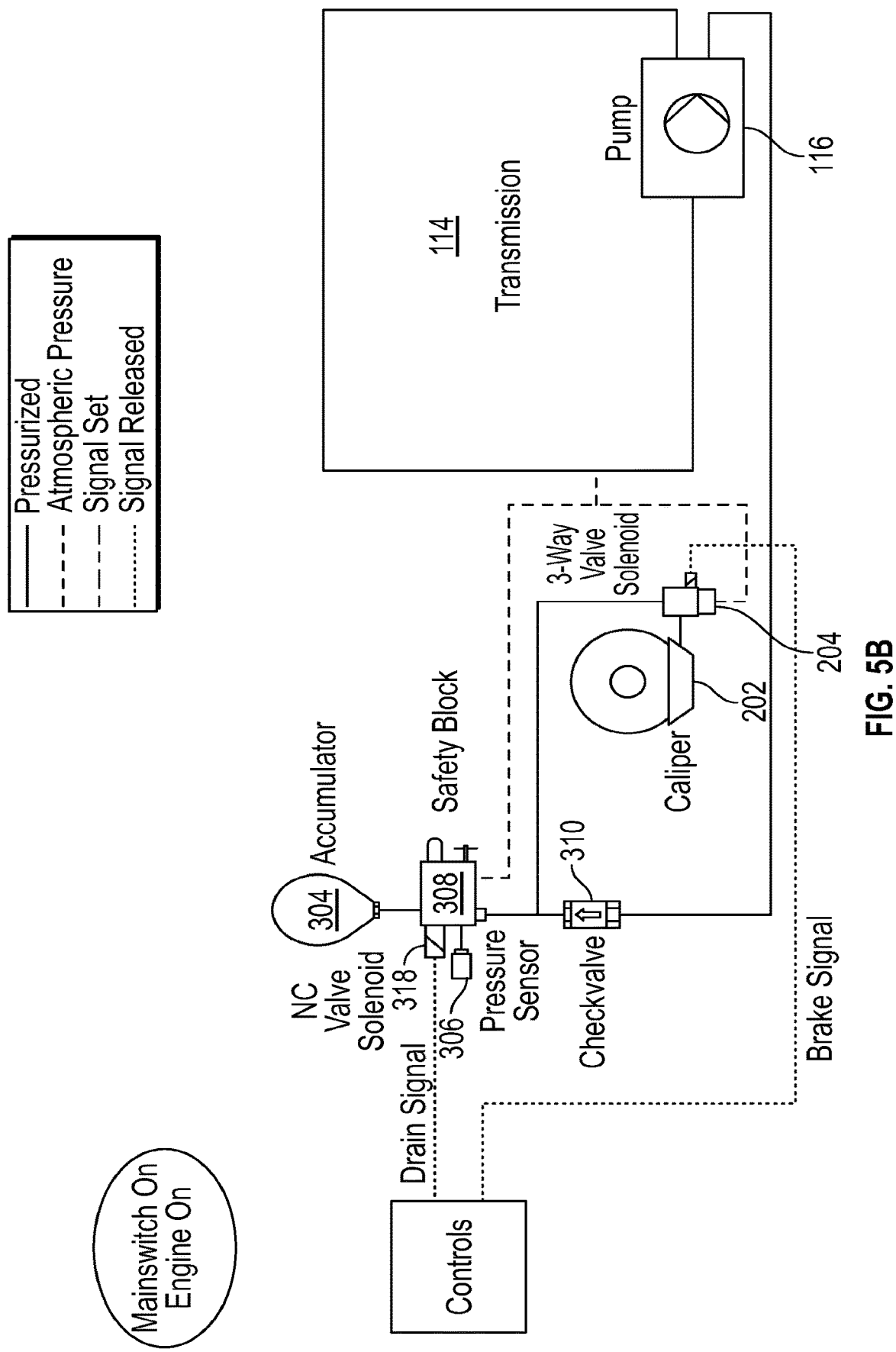
FIG. 5B illustrates a schematic showing hydraulic control of the brake system illustrated in FIG. 3 when the pump trailer is operating at step 404 of the method illustrated by FIG. 4.

FIGS. 5A-5E illustrate modes of operation of the brake system 300 when the brake system 300 is operating in accordance with method 400 illustrated by FIG. 4. FIG. 5A illustrates a schematic showing hydraulic control of the brake system illustrated in FIG. 3 when the pump trailer is operating at step 402 of the method 400. At step 402, as indicated in FIG. 5A, the engine 112 is running and the transmission 114 is rotating such that the hydraulic pump 116 is pressurizing the transmission oil in the hydraulic lines and through the check valve 310 so that a first portion of the transmission oil is introduced to the safety block 308 and the accumulator 304 and a second portion of the transmission oil is introduced to the three-way solenoid valve 204. In this mode of operation illustrated in FIG. 5A, the three-way solenoid valve 204 is closed so that the brake 102 is not set by the pressure of the second portion of the transmission oil and the transmission continues to rotate and drive, or otherwise provide energy to, the hydraulic pump 116. Also, during the mode of operation illustrated in FIG. 5A, the first portion of transmission oil passing through the safety block 308 continues to charge the accumulator 304 until the accumulator 304 is full or until a pre-set or desired pressure is reached inside the accumulator 304.

A user or a control system can then engage the brake 102, as at step 402. FIG. 5B illustrates a schematic showing hydraulic control of the brake system illustrated in FIG. 3 when the pump trailer is operating at step 404 of the method illustrated by FIG. 4. At step 404, the engine 112 is running and the transmission 114 is stopped as a result of the engagement of the brake 102 via actuation of the caliper 202. The caliper 202 can be actuated by introduction of transmission oil from the hydraulic pump 116, the accumulator 304, or both at a pressure sufficient to actuate the caliper 202.

Figure 5C:
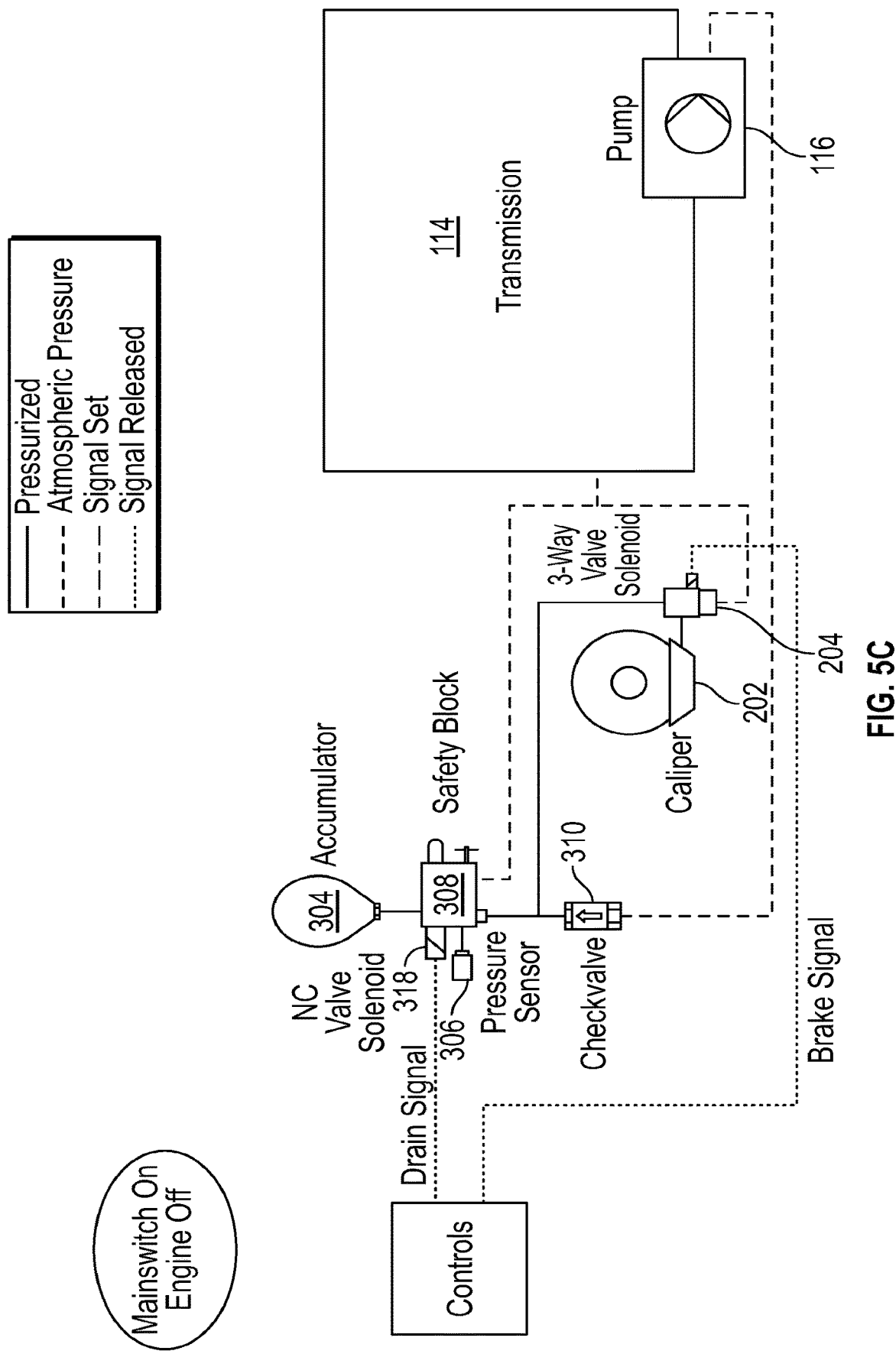
FIG. 5C illustrates a schematic showing hydraulic control of the brake system illustrated in FIG. 3 when the pump trailer is operating at step 406 of the method illustrated by FIG. 4.

A user or control system (e.g., an ESC) can then turn off or otherwise idle the engine 102, as at step 406. FIG. 5C illustrates a schematic showing hydraulic control of the brake system illustrated in FIG. 3 when the pump trailer is operating at step 406 of the method illustrated by FIG. 4. At step 406, the brake 102 can be released, thereby placing the transmission 114 in neutral.

Figure 5D:
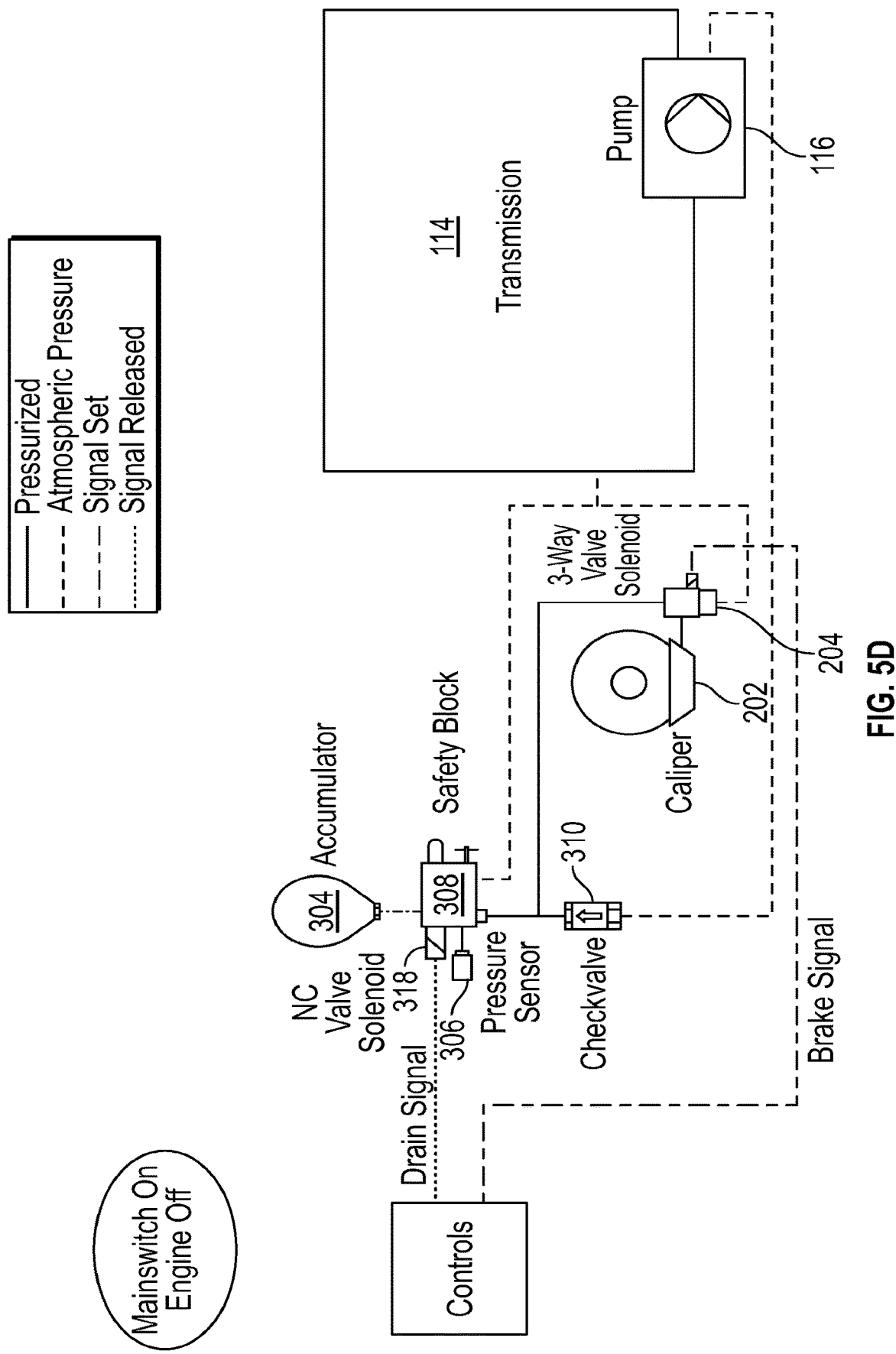
FIG. 5D illustrates a schematic showing hydraulic control of the brake system illustrated in FIG. 3 when the pump trailer is operating at step 408 of the method illustrated by FIG. 4.

A user or control system (e.g., the ESC) can then reapply or reset the brake 102 to place the transmission 114 in a stationary mode. While the transmission 114 is in a stationary mode, the shaft 104 and pump 110, each mechanically linked to the transmission 114, can also be rendered stationary. FIG. 5D illustrates a schematic showing hydraulic control of the brake system illustrated in FIG. 3 when the pump trailer is operating at step 408 of the method illustrated by FIG. 4. At step 408, the brake 102 is set at a force sufficient to prevent rotation of the transmission 114 and the shaft 104 so that both transmission 114 and the shaft 104 are stationary. At step 408, the engine 112 can remain in an off position. For example, the engine 112 can be shut off or otherwise rendered stationary by virtue of being in a standby mode induced by the ESC. Standby mode can include a state in which the engine 112 is turned off and comes to a standstill, between two successive production phases in which the pumps operate under high pressure and press material into a borehole, particularly between two test phases or between a test phase and a production phase.

When the engine 112 is placed in a standby mode or is otherwise shut off, the pressurized transmission oil in the accumulator 304 can be utilized as needed to achieve a transmission oil pressure sufficient to actuate the brake caliper 202 upon input of a brake signal, thereby placing the transmission 114 in a stationary mode when the engine 112 is off or idle. The setting of the brake 102 can place the transmission 114, the shaft 104, and the pump 110 in a stationary mode in anticipation of restarting the engine 112, either manually or with assistance from the ESC. By placing the transmission 114 in a stationary mode prior to restarting the engine 112, damage from the restart can be avoided since the shaft 104 and pump 110 mechanically linked or otherwise coupled to the transmission 114 would be prevented from unwanted forces experienced by the restarting of the engine 112.

A user or control system can then turn the engine 112 and the mainswitch off so that the accumulator 304 can be drained, as at 410. FIG. 5E illustrates a schematic showing hydraulic control of the brake system illustrated in FIG. 3 when the pump trailer is operating at step 410 of the method illustrated by FIG. 4. At step 410, the accumulator 304 and safety block 302 can be drained of transmission oil contained therein and in the flow lines coupled to or fluidically linked to accumulator 304 and safety block 302, thereby enabling maintenance or removal of any portion of the brake system 300. The transmission oil can be drained from the accumulator 304 and safety block 302 by opening the two-way solenoid valve 318 to allow the transmission oil to pass therethrough and ultimately into the reservoir 208. The accumulator 304 and safety block 302 can also be drained of the transmission oil by opening the second valve 314 to allow the transmission oil to pass therethrough and ultimately into the reservoir 208. A user or control system can then turn the pump trailer 100 and its engine 112 back on, for example, via a cold start, to return to the mode of operation illustrated by FIG. 5A.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

What is claimed is:

1. A method for controlling a hydraulic fracturing pumping system, comprising:
   stopping an engine coupled to the hydraulic fracturing pumping system;
   supplying pressure from an accumulator to a hydraulic braking system upon input from a brake signal that opens a three-way solenoid valve in fluid communication with the accumulator to allow transfer of transmission oil from the accumulator to brake under a pressure sufficient to actuate a brake of the hydraulic braking system;
   starting the engine coupled to the hydraulic fracturing pumping system comprising at least one pump; and
   releasing the brake.

2. The method of claim 1, wherein the engine is a diesel engine.

3. The method of claim 1, wherein the engine is stopped by placing the engine in a standby mode.

4. The method of claim 1, wherein the hydraulic fracturing pumping system comprises a transmission coupled to the engine, wherein the transmission comprises a transmission oil.

5. The method of claim 4, wherein the pressure in the accumulator is obtained by pressurizing the transmission oil and introducing pressurized transmission oil into the accumulator.

6. The method of claim 1, wherein the brake is a disc brake that is disposed on a shaft coupled to the transmission, the engine, and the at least one pump.

7. The method of claim 1, wherein actuating the brake of the hydraulic braking system comprises actuating a brake caliper.

8. The method of claim 1, wherein when the solenoid valve is closed the transmission oil from the accumulator is introduced to a reservoir.

9. The method of claim 1, wherein supplying pressure from the accumulator to the hydraulic braking system comprises supplying a pressure of about 500 kPa to about 5,000 kPa from the accumulator to the hydraulic braking system.

10. A hydraulic fracturing pumping system, comprising:
a first pump coupled to an engine via a transmission, wherein the transmission is coupled to a transmission oil reservoir;
a second pump coupled to the transmission;
an accumulator device coupled to the hydraulic pump, the accumulator device comprising:
an accumulator:
a pressure sensor a safety block; and
a check valve; and
a hydraulic brake system coupled to the accumulator device, the hydraulic brake system comprising a three-way solenoid valve in fluid communication with the accumulator, the transmission oil reservoir, and a brake.

11. The system of claim 10, wherein the accumulator comprises a vessel.

12. The system of claim 10, wherein the check valve is fluidly coupled to the hydraulic pump and is disposed downstream from the hydraulic pump.

13. The system of claim 10, wherein the safety block comprises:
a first valve;
a second valve;
an overflow valve; and
a two-way solenoid valve, wherein the first valve and the second valve are manually operatable valves, and wherein the first valve, the second valve, the overflow valve, and the two-way solenoid valve are fluidly coupled to each other and arranged in a parallel configuration to each other.

14. The system of claim 10, wherein the pressure sensor is coupled to an engine standby controller (ESC).

15. The system of claim 14, wherein the first pump, the second pump, the engine, the transmission, the accumulator, and the ESC are all disposed onto a single trailer.

16. The system of claim 10, wherein the brake is disposed on a shaft disposed between the engine and the first pump.

17. The system of claim 10, wherein the first pump is a reciprocating plunger pump.

18. The system of claim 10, wherein the second pump is a hydraulic pump.

19. The system of claim 10, wherein the engine is a diesel engine.

20. A hydraulic fracturing pumping system disposed on a trailer, the hydraulic fracturing pumping system comprising:
a diesel engine;
a transmission;
a hydraulic pump coupled to the transmission;
a transmission oil reservoir coupled to the transmission;
a reciprocating plunger pump;
a shaft mechanically linking the transmission to the reciprocating plunger pump;
an accumulator device in fluid communication with the hydraulic pump, the accumulator device comprising:
an accumulator:
a pressure sensor:
a safety block; and
a check valve; and
a hydraulic brake system coupled to the accumulator, the hydraulic brake system comprising a three-way solenoid valve.

* * * * *